United States Patent [19]

Buchanan et al.

[11] 4,354,765
[45] Oct. 19, 1982

[54] HYPHEN CHARACTERIZATION APPARATUS FOR A TYPEWRITER

[75] Inventors: James C. Buchanan; Edward V. Rutkowski, Jr., both of Lexington, Ky.

[73] Assignee: International Business Machines Corporation, Armonk, N.Y.

[21] Appl. No.: 79,415

[22] Filed: Sep. 27, 1979

[51] Int. Cl.³ .............................................. B41J 5/30
[52] U.S. Cl. .................................. 400/7; 400/63; 364/900
[58] Field of Search .......... 400/7, 63, 64, 76, 252, 400/279, 697.1; 364/200 MS File, 900 MS File; 199/18

[56] References Cited

U.S. PATENT DOCUMENTS

| | | | |
|---|---|---|---|
| 2,217,150 | 10/1940 | Ayres | 400/7 |
| 3,297,124 | 1/1967 | Sims | 400/7 X |
| 3,299,408 | 1/1967 | Wang et al. | 364/900 |
| 3,307,154 | 2/1967 | Garth et al. | 400/7 X |
| 3,386,552 | 6/1968 | Lorber et al. | 400/7 |
| 3,439,341 | 4/1969 | Dolby et al. | 400/7 X |
| 3,490,004 | 1/1970 | Ross | 364/900 |
| 3,529,296 | 9/1970 | Friedman et al. | 400/7 X |
| 3,537,076 | 10/1970 | Damerau | 364/900 |
| 3,579,193 | 5/1971 | Bernier | 400/63 X |
| 3,605,997 | 9/1971 | Sinnott | 199/18 |
| 3,895,704 | 7/1975 | Norris | 400/63 X |
| 3,915,278 | 10/1975 | Spence et al. | 400/63 X |
| 4,087,852 | 5/1978 | Campbell et al. | 400/7 X |
| 4,139,902 | 2/1979 | Bodin | 400/7 X |

OTHER PUBLICATIONS

IBM Technical Disclosure Bulletin, "Blank Hyphen Techniques," Berger et al., vol. 17, No. 4, Sep. 1974, p. 961.

Primary Examiner—Ernest T. Wright, Jr.
Attorney, Agent, or Firm—George E. Grosser

[57] ABSTRACT

In a typewriter having text storage capability, the hyphen code that is stored in response to depression of a hyphen key is conditioned on printing position and on the codes adjacent to the hyphen code in a text string. If a hyphen is keyed after the start of the return zone, is preceded by a graphic representative code and is followed by a keyed carrier return, a distinctive hyphen code representative of a syllable hyphen is recorded. Otherwise, a regular hyphen is recorded unless the hyphen key has been depressed in conjunction with a condition key (e.g. the CODE key), in which case a code representative of a required non-breaking hyphen is recorded. As a result of so controlling the recorded hyphen codes at the time of keyboarding, the operator's intentions for hyphenation may be achieved with little departure from normal keyboarding routine.

2 Claims, 8 Drawing Figures

HYPHEN CHARACTERIZATION APPARATUS FOR A TYPEWRITER

BACKGROUND OF THE INVENTION

1. Field of the Invention

The present invention relates generally to text processing equipment having a keyboard for input and, more particularly, to a logic device for use in such equipment for automatically characterizing by type hyphen codes occurring in a text string.

2. Discussion Relative to the Art

In a typewriter with text storage capability, the hyphen code presents an ambiguity because there are several types of hyphens that must be treated differently in certain playback situations. The syllable hypen should be omitted if changes occur, for example, through editing, that move such a hyphen from an end-of-line position. The normal required hyphen cannot be removed but may serve as a word breaking character. A non-breaking required hyphen, for example, the hyphen in a social security number, may not be deleted and cannot serve as a word breaking character.

To permit recognition of the different possibilities for hyphens, text processors often provide for special keyboarding to indicate a required hyphen is intended, e.g. depressing the "CODE" and hyphen keys concurrently may result in a required hyphen code being recorded. Such keyboarding rules, however, require the operator to make a decision and disrupt the normal typing process which, for a skilled operator, involves an almost automatic keyboarding response. Also, such procedures typically do not distinguish between non-breaking and regular required hyphens.

SUMMARY OF THE INVENTION

To provide a more complete range of hyphenation choices and yet reduce the need for special keyboarding by the operator, the kind of hyphen code stored in response to a hyphen key depression is related to the position of the "return zone" and the codes adjacent to the hyphen code in a text string. Hyphens keyboarded before the return zone are assumed by the characterization logic to be regular required hyphens. A hyphen keyboarded after the start of the return zone, on the other hand, is caused by the characterization logic to be stored as a syllable hyphen (represented by a distinct hyphen code) if they are followed by a keyed carrier return. Such hyphens, after the start of the return zone, are recorded as normal required hyphens, however, if a carrier return does not immediately follow or is automatically inserted by the typewriter. Also, it is preferably determined if the hyphen is preceded by a graphic since syllable hyphens break a word and would not follow a space code. Preferably, logic is also provided to cause hyphens that are specially keyed in conjunction with the CODE key to be stored using a distinctive code representing the required non-breaking type of hyphen.

By so controlling the selection of stored hyphen codes, recognition is taken of the operator's propensity, on the one hand, to keyboard a carrier return when inserting a syllable hyphen, and, on the other hand, to allow the automatic carrier return logic to establish line endings where normally occurring hyphens are encountered in the source material for typing. Also, it is recognized that a syllable hyphen occurs only at the end of a portion of a word and may not be preceded by a non-graphic such as a space. In the limited number of situations where a non-breaking hyphen is intended, a special keyboarding procedure using the hyphen key in combination with a condition indicating key, e.g. the CODE key, causes a distinctive hyphen code to be stored.

With such automatic characterization of hyphens, the operator's intentions may generally be achieved without resort to unusual keying procedures that may be confusing and wasteful of time.

BRIEF DESCRIPTION OF THE DRAWING

A presently preferred implementation of the invention will now be described in detail with reference to the drawing wherein.

DETAILED DESCRIPTION OF A PRESENTLY PREFERRED IMPLEMENTATION

Figure 1:
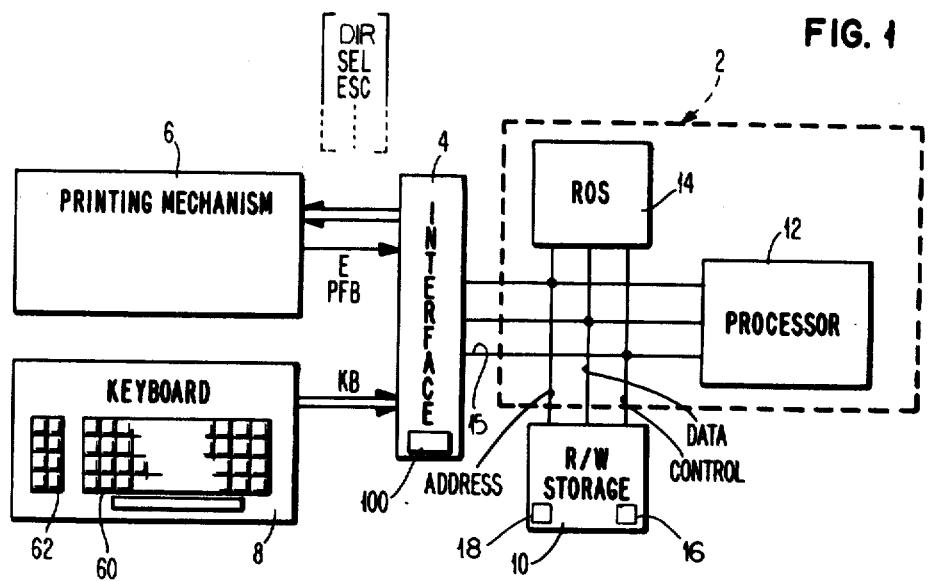
FIG. 1 is a diagram in block form indicating various instrumentalities of a typewriter suitable for implementation of the invention.

Referring to FIG. 1, a text storage typewriter suitable for use according to the invention includes an operation-controlling logic device 2 which is coupled through an interface 4 to printing apparatus 6 and keyboard apparatus 8. Accessible storage for text and other information is provided by a read/write storage device 10 that cooperates with the logic device 2. Preferably, logic device 2 comprises a sequential logic processor 12 that cooperates with a read-only-storage (ROS) 14 which embodies in coded form a set of predefined signal handling responses for the processor 12. The ROS 14 also holds fixed data used, for example, in calculations. Such a signal processing arrangement is well known in the art and is employed, for example, in IBM Electronic Typewriter Models 50 and 60.

With such an arrangement, the signal responses are, for the most part, defined by structure of the ROS 14 using various basic operations of processor 12 as building blocks. Part of the overall response characteristic is typically built into the interface 4 and the degree of pre- and post-processing of signals that occurs there is typically selected in view of cost, performance and timing considerations. It should be appreciated, however, that essentially similar response characteristics may be achieved using direct wired logic according to techniques known in the art. The processor approach merely involves a time-sharing of hardware building blocks as compared to the permanent identification of logic devices to respective branches of a fixed logic system.

Figure 2:
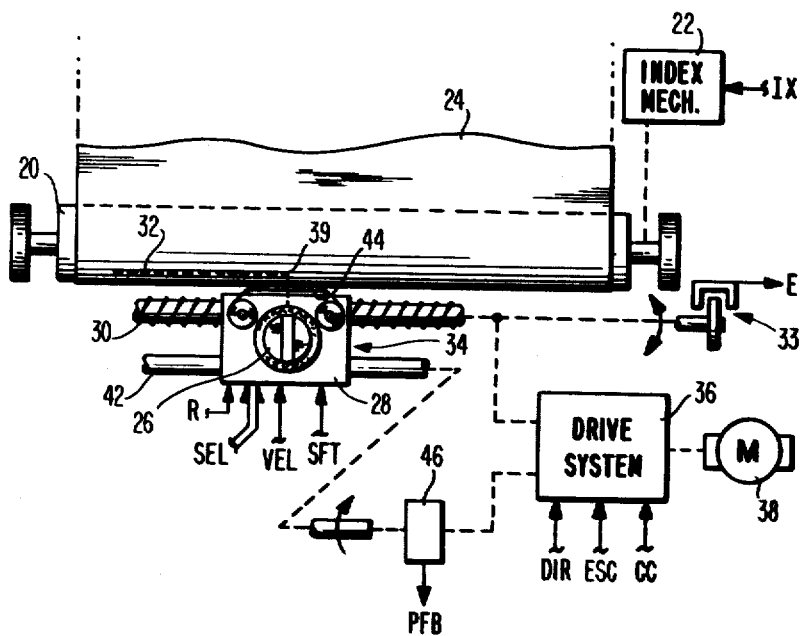
FIG. 2 is a simplified partial plan view of a printer suitable for implementation of the invention.

Printing apparatus 6 may take various known forms and, may, for example, be a conventional single element impact printer or a typebar printer or even a matrix printer such as an ink jet printer. Referring to FIG. 2, a presently preferred kind of printing apparatus 6 to cooperate in an implementation of the invention includes paper feed means such as a platen 20 (and associated feed rollers not shown). The platen 20 is coupled to an indexing device 22 that responds to a signal IX to cause incremental rotation for advancing an inserted medium such as a sheet of paper 24 along a feed path.

A character forming element 26 is mounted on a support 28 that cooperates with linear drive apparatus such as a lead screw 30 to be moveable parallel to the platen 20 for defining a line 32 for printing. Position along the line 32 is indicated by a signal E produced by a motion detector 33 that is coupled to the lead screw 30.

The element 26 and support 28 taken together comprise a carrier 34 which is controllably positioned along the line 32 by a drive system 36 that responds to control and direction signals ESC and DIR, respectively, in transmitting motion from a motor 38 to the lead screw 30. Actual printing at a present printing position 39 is effected using selection and impacting means (not shown) that cooperate with element 26 and respond to selection and velocity signals indicated as SEL and VEL respectively. An upper case/lower case shift operation is also provided in response to a signal SFT.

Power for printing is supplied by a print shaft 42 that is rotated by the drive system 36 in response to a signal CC. A cam and follower system (not shown) transfers motion for selection and impacting of element 26. A ribbon carrier and associated drive device (not shown) hold a ribbon 44 between the element 26 and the platen 20 for making an ink impression on the paper 24, and ribbon positioning movements are controlled by a signal denoted R. A detector 46 that cooperates with print shaft 42 serves to indicate when a print cycle is completed by means of a printer feedback signal PFB.

The abovementioned signals for the printing apparatus 6 are preferably transmitted to or from the interface 4 (see FIG. 1).

The above-described kind of printing apparatus 6 is well known in the art and, as was mentioned above, is described as environment for the invention. Such a printing apparatus 6 is exemplified in the IBM Electronic Typewriter Models 50 and 60. A more detailed description of such a printing apparatus 6 is provided in the IBM Electronic Typewriter Service Manual.

Figure 4:
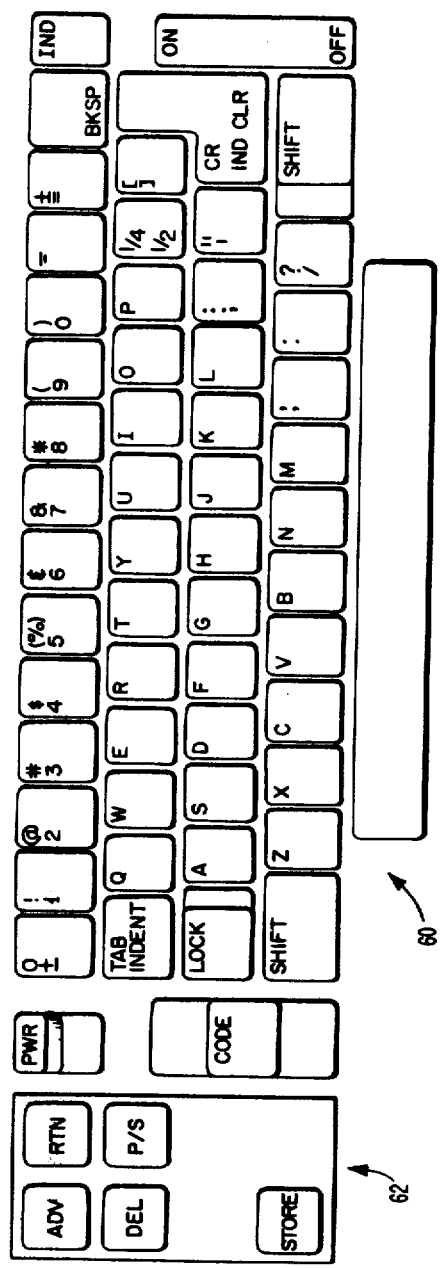
FIG. 4 is a simplified plan view of a keyboard.

Referring to FIGS. 1 and 4, the keyboard apparatus 8 serves as an input device for an operator and produces coded signals KB responsive to depressions of individual keys or selected combinations thereof.

Included among the keys for a main keyboard area 60 are alphabetic keys, numeric keys, punctuation keys, a carrier return key, a hyphen key, and a spacebar.

An auxiliary keyboard area 62 preferably includes ADVANCE, DELETE, RETURN, PLAY/STOP (P/S), and STORE keys which initiate modes for recording, playback and editing of text strings. Various stored codes for the presently preferred implementation are indicated in part in Table 1. It will be appreciated, however, that various coding plans are possible.

TABLE 1

| STORED CODE IN HEXADECIMAL | PRINTING OPERATION REPRESENTED |
|---|---|
| 00 | Null |
| 06 | Space |
| 08 | Index |
| 0C | Discretionary Carrier Return |
| 0D | Required Carrier Return |
| 10-6F | Graphics |
| 70 | Syllable Hyphen |
| 86 | Coded Space |
| 8E | Backspace |
| 9A | Word Double Underscore |
| 9B | Multiple Word Double Underscore |
| 9C | Stop Code |
| C2 | Coded Hyphen |
| D6 | Word Underscore |
| D7 | Multiple Word Underscore |
| EE | Continuous Underscore |
| F0 | Tab |
| F1 | "Negative" Tab |
| F2 | Indent Tab |
| F3 | "Negative" Indent Tab |
| F4 | Multiple Backspace |
| F6 | Indent Clear |
| FF | Separator, separates phrases in the text |
| 42 | Normal Hyphen |

Certain stored codes are converted from the code produced by the keyboard apparatus 8 and certain keyboard codes of particular interest are indicated in Table 2.

TABLE 2

| CODE (HEXADECIMAL) | OPERATION REPRESENTED |
|---|---|
| 42 | Normal Hyphen |
| 04-05 | Tab |
| 0C-0D | Carrier Return |
| 8C-8D | Indent Clear |

The monitoring of printer position is important to the invention and, accordingly, a brief discussion of known techniques for determining the present printing position will be provided.

It is possible to directly detect printing position using position encoders and such encoders are known which produce either digital or analog output signals. For typewriters, however, it is more usual to provide a detector which indicates increments of motion, for example, using a disc having radial metering marks and cooperates with a photodetector (indicated in simplified form as detector 33, FIG. 3) to indicate position shifts.

With such a known approach, logic (not shown) located in the processor 12 (see FIG. 1) maintains a count (PPOS) in a specific storage location 16 that is indicative of the present printing position. Using a presently preferred technique for maintaining the stored count (PPOS) indicative of a present printing position, the processor 12 determines the total change to the position count corresponding to a commanded operation, e.g., printing of a character, and updates the position count without regard to printer operation. The count change, however, is written into a counter 50 (FIG. 3) of interface 4 using a decoder 52 which responds to an address code assigned to direction and position increment data. This counter 50 and the decoder 52 then sends commands ESC and DIR to the drive system 36 of printing apparatus 6 until the count total is reduced to zero by the feedback pulses E from detector 33. This type of print position monitoring and control is used, for example, in the IBM Electronic Typewriter Model 50.

Figure 5:
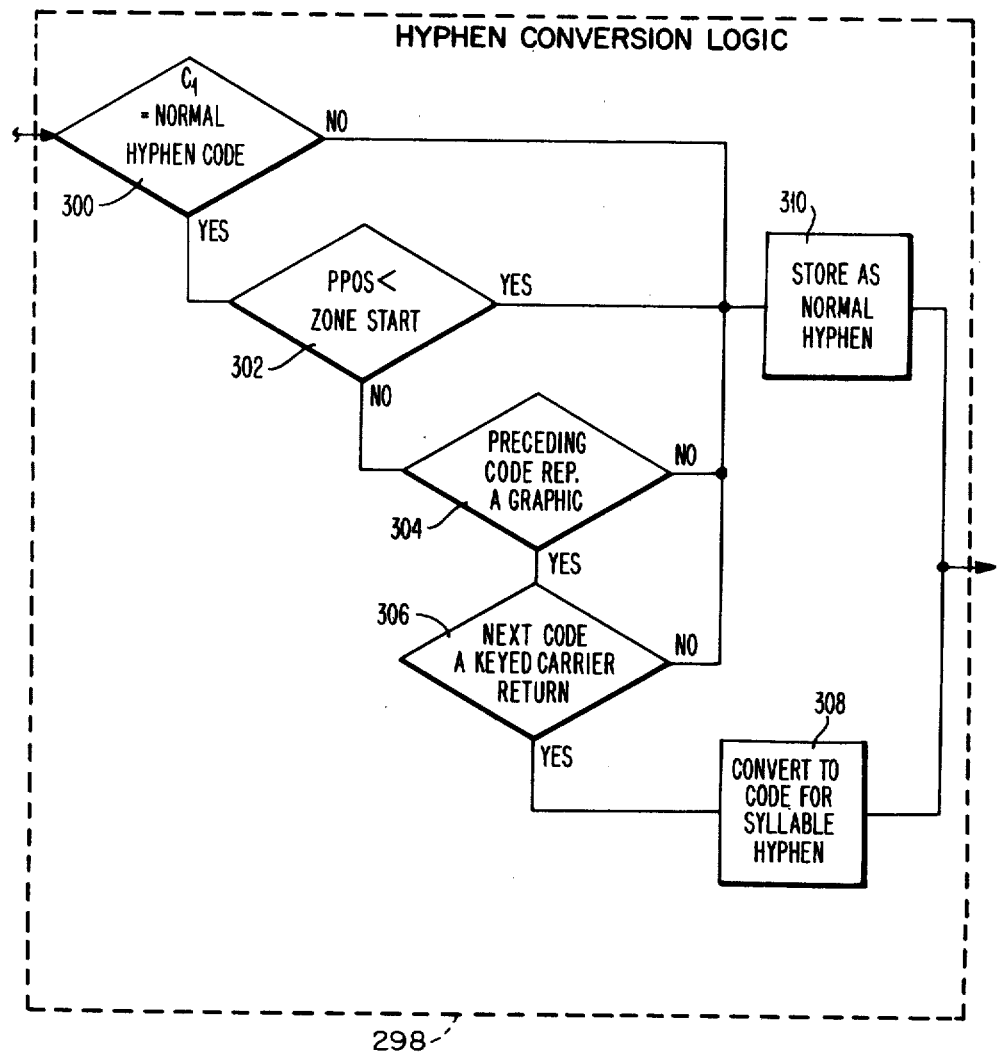
FIG. 5 is a simplified flow chart of preferred logic according to the invention.

As is indicated in the simplified logic diagram of FIG. 5, the hyphen conversion logic 298 according to the invention responds to a normal hyphen code which represents a required hyphen and, under certain conditions, converts such code to a syllable hyphen code for storage in the text string. As a result of such conversions, a text position shift resulting, for example, from editing, permits the hyphen to be omitted on playback if it does not occur in the return zone. Such conversion is triggered when the code is a normal hyphen code (block 300) and occurs after the start of the return zone (block 302) which is typically five position increments before the right margin. Also, the preceding code is tested for representation of a graphic (block 304) and the following code is tested for a keyed carrier return (block 306). Right margin and left margin locations for such a printer are typically identified by coded position numbers which are referenced to the increments for the detector 33 (FIGS. 1 and 3) and are stored in dedicated locations of the read/write storage device 10. Typically, for processor controlled printers, right margin and left margin locations can be selected by the operator at a keyboard such as the keyboard 8. The IBM Model 50 and 60 Electronic Typewriters, for example, provide for such selection of margins.

If these conditions are satisfied, the hyphen code is converted (block 308); otherwise, a code representing a required breaking hyphen is stored (block 310). If the hyphen key is depressed in conjunction with the "CODE" key, a code (C4) is produced that is treated by the logic as representing a required non-breaking hyphen (see description below).

Presently preferred logic for incorporating the invention will now be described in detail with reference to a flowchart (FIG. 6) and logic definition (Logic Tables 1-17) in terms of a structured programming language. The structured programming language transcends the variation in mnemonics that may occur from processor to processor and such definition provides the information necessary for those skilled in the art to produce logic device structures, e.g. cooperating ROS processor structures for practicing the invention. Descriptive variable names have been used in the Logic Tables to make them essentially self-descriptive; however, a brief description of each tale is provided. Referring to FIG. 7, the signal processing structured into the logic device 2 is represented according to partitioning by subroutine organization to include partitioned logic 101-118 which is described below in detail with reference to Logic Tables 1-17 and FIG. 6, respectively.

Figure 6:
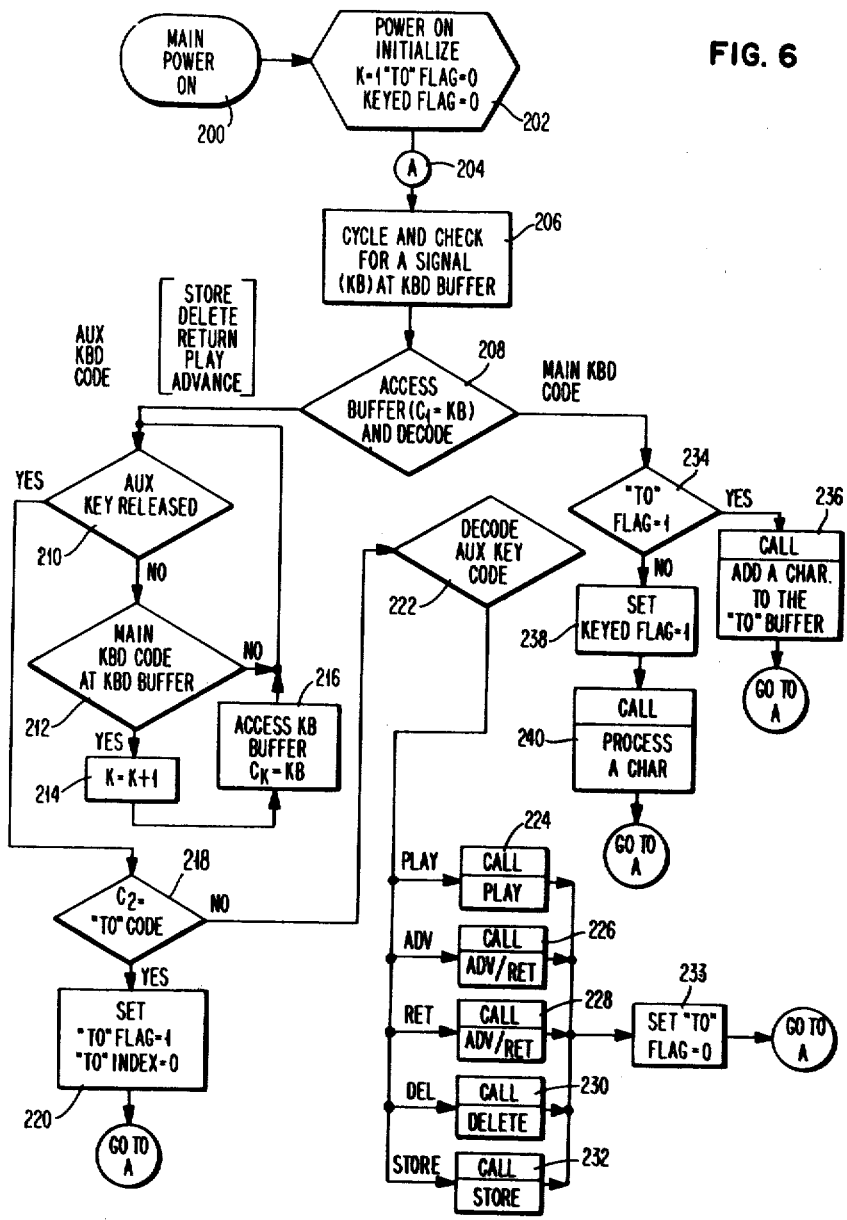
FIG. 6 is a flow chart indicating the main logic organization for the presently preferred implementation.
Figure 7:
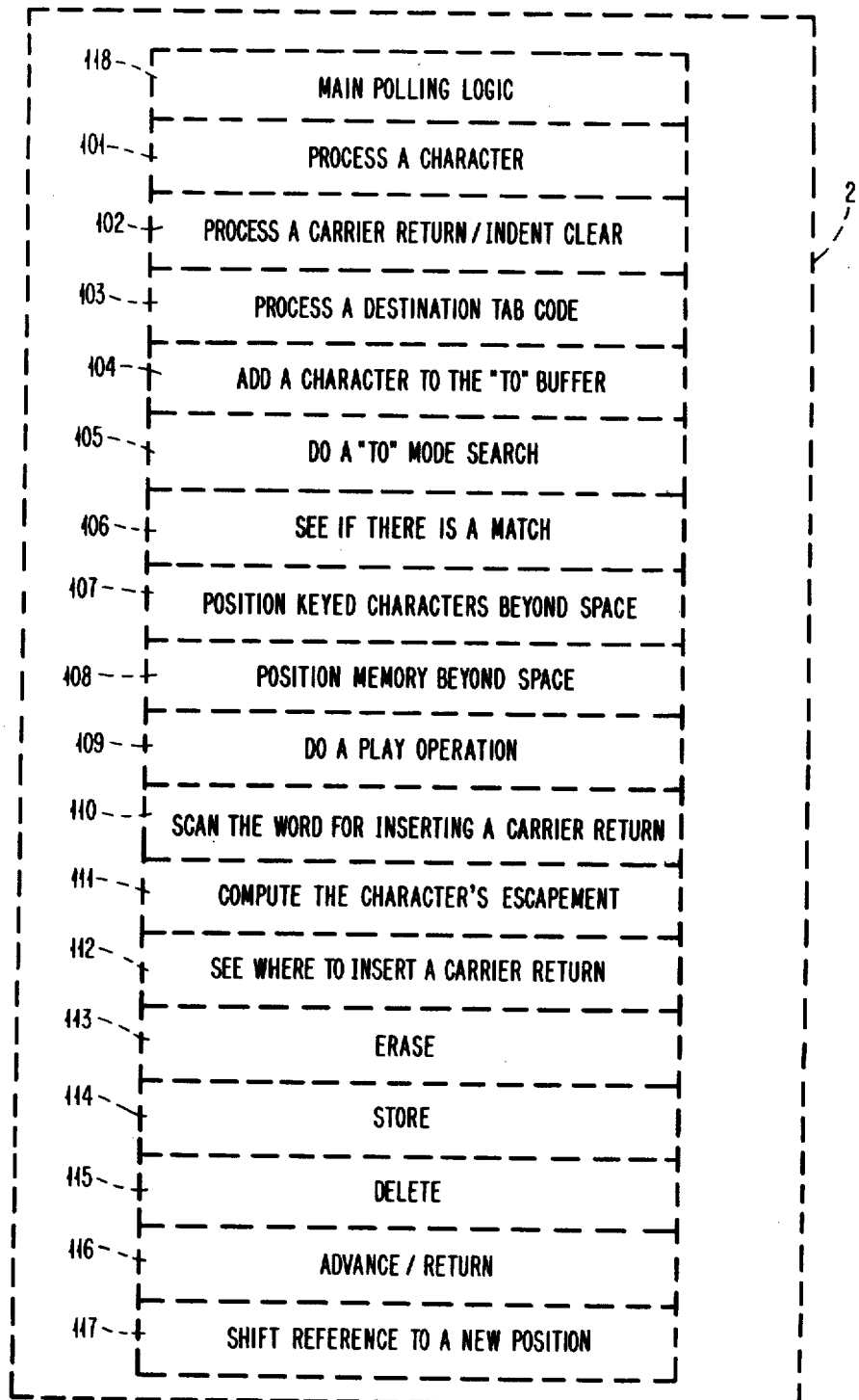
FIG. 7 is a block diagram indicating signal processing logic partitioned according to subroutine organization.

Referring to FIG. 6, the main polling logic 118 that is incorporated in the structure of logic device 2 is indicated diagramatically. Such logic structure serves to coordinate the processing of signals KB that arrive at a keyboard buffer 100 of interface 4.

When the machine power is switched on (Block 200), an initialization of flags and index values occurs (Block 202). After an entry point A (Block 204), a repeated check is maintained for a signal at the keyboard buffer 100 (Block 206). Upon detecting a signal at buffer 100, e.g. using an accessed flag at a preselected register (not shown) of the interface 4 or an interrupt signal on the control bus 15, the buffer 100 is accessed and the keyboard signal (KB) is stored in a stored variable denoted $C_1$ and is decoded (Block 208).

An initial distinction is made between codes from the auxiliary keyboard 62 (which preferably control operations with text storage) and codes from the main keyboard 60. The auxiliary keyboard selections are preferably indicated by single bit codes, whereas the main keyboard 60 preferably represents selections as eight bit codes. For auxiliary keyboard codes, it is further determined whether a main keyboard key is depressed while the auxiliary keyboard key remains depressed. If so, the index K is incremented and the code is stored as $C_K$ (Blocks 210-216).

Once the auxiliary keyboard key is released, a check is made to determine if a content-addressed search (the "TO" mode) has been selected (Block 218) in which case a "TO" flag and a "TO" index for use in the search operations are set (Block 220). If a search is not selected, a branch to appropriate logic for the selected mode (PLAY, ADVANCE, RETURN, DELETE or STORE) is effected (Blocks 222-232). Upon returning from one of the mode operations (Blocks 222-232), the TO FLAG is reset (Block 233).

If a main keyboard code is detected for the signal processing described at Block 208, the "TO" flag is checked (Block 234) to determine if a search address is being keyboarded. If so, a branch operation is effected to logic for adding codes to the search address buffer which is labeled as the "TO" buffer (Block 236). Such buffer is preferably a series of locations of the storage device 10 (FIG. 1) and the logic for storage of a text address is described more fully below.

For the situation where, for the test at Block 234, a search address is not being keyboarded ("TO" flag=0), a flag (denoted "Keyed Flag") indicating the occurrence of a keyed character is set to a preselected state (Block 238) and a branch operation (Block 240) to logic for processing a character (described below) is initiated. Descriptions of the blocks of logic entered by branching from the main polling loop (FIG. 6) are provided below in terms of a structured programming language. It is assumed that storage locations 18 for stored code (denoted M) are sequential and that a storage section having empty storage has been created at the reference point to permit code additions and deletions without constant shifting of trailing codes. Pointers p and r indicate the beginning and end of the empty section. New code is added at location Mp and during playback from storage, a code progresses from the location $M_r$ to $M_p$ as it is played and pointers r and p are incremented for the next code.

Referring to Logic Table 1, the logic 101 entered from block 240 (FIG. 7) is described in structured programming language. Section 1 performs test based on the beginning of the return zone (e.g. right margin count—count for 5 character positions) and the nature of the present and preceding code are checked in order to determine if a carrier return should be inserted to establish a line end point. If so, a transfer occurs to carrier return logic 102 described below.

Section 2 detects hyphen codes and sets flags to indicate whether or not the hyphen is keyed by operator. At Section 3, a flag is set and a transfer to special carrier return logic 102 occurs if the code being processed is a carrier return code. Tab and indent tab codes are detected in Section 4 and the tab destination is stored in the variable "TAB DESTINATION". The variable TAB DESTINATION is adjusted to be measured relative to the left margin at Sections 4a and 4b. The tab code itself is converted to a destination tab identifier at sections 4a and 4b, which identifier codes correspond to either a positive destination tab ($F0_{16}$), a positive indent tab ($F2_{16}$), a negative destination tab ($F1_{16}$) or a negative indent tab ($F3_{16}$). (The subscript "16" is used to indicate numbers to the base sixteen.)

At Section 5, a branch is initiated to logic 103 for processing a destination tab code (described below). A test for an erase code is provided in Section 6 and a transfer to erase logic 113 (described below) occurs if an erase code is presented. The processing of an indent clear code is treated in Section 7. For Section 8, all special codes already eliminated in Sections 1-7 and normal character processing may occur. The position of the last graphic printed $E_1$ is updated if appropriate for use with the carrier return insertion logic 112 (Logic Table 12).

LOGIC TABLE 1

| Process a Character | |
|---|---|
| Sec 1 | IF PPOS > (RT margin − 5) and $C_1$ = graphic and $M_p$ = space code or hyphen code |
| • | THEN set the INSERTED CARRIER RETURN FLAG = 1 |
| • | CALL (Process a Carrier Return/Indent Clear) |
| • | ENDIF |
| Sec 2 | IF $C_1$ = hyphen code |
| • | THEN IF the KEYED FLAG = 1 |
| • | THEN set the HYPHEN KEYED FLAG TO 1 |
| • | ELSE set the HYPHEN KEYED FLAG TO 0 |
| • | ENDIF |
| • | Send print hyphen command to interface 4 |
| • | Set $E_1$ = PPOS |
| • | IF the STORE FLAG = 1 |
| • | THEN set $M_p$ = regular hyphen code |
| • | ENDIF |
| Sec 3 | ELSE IF $C_1$ = carrier return code |
| • | THEN set the INSERTED CARRIER RETURN flag to 0 |
| • | CALL (Process a Carrier Return) |
| Sec 4 | ELSE IF $C_1$ = keyboard tab code or a keyboard indent tab code |
| • | THEN Search active tab storage for first entry greater than PPOS and store in TAB DESTINATION |
| Sec 4a | IF the location is at or beyond the left margin (LM) |
| • | THEN set TAB DESTINATION = TAB DESTINATION − LM |
| • | set $C_1$ = postive tab code (F0) (F2 if indent) |
| Sec 4b | ELSE set TAB DESTINATION = LEFT MARGIN − TAB DESTINATION |
| • | SET $C_1$ = negative tab code (F1) (F3 if indent) |
| • | ENDIF |
| • | ENDIF |
| Sec 5 | IF $C_1$ = a destination tab code (F0 to F3) |
| • | THEN CALL (Process a Destination Tab Code) |
| Sec 6 | ELSE IF C = erase code (0E or 0F) |
| • | THEN CALL (Erase) |
| Sec 7 | ELSE IF $C_1$ = Keyboard Indent Clear Code (8C or 8D) |
| • | THEN set $C_1$ = Stored indent clear code (F6) |
| • | ENDIF |
| • | IF $C_1$ = Stored indent clear code (F6) |
| • | THEN CALL (Process a Carrier Return/Indent Clear) |
| Sec 8 | ELSE process code normally |
| • | IF $C_1$ = graphic code |
| • | THEN set $E_1$ = PPOS |
| • | ENDIF |
| • | ENDIF |
| • | ENDIF |
| • | ENDIF |
| • | ENDIF |
| • | RETURN |

Referring to Logic Table 2, carrier return processing logic 102 at Section 1 tests to determine if the carrier return was automatically inserted. If so, control skips to Section 4 and the carrier return is processed. If not, a temporary index m is set up for the present reference location.

In Section 2, a test is made for an underscore code and the temporary reference is shifted behind any such codes.

Section 3 tests for a normal hyphen code ($42_{16}$) and backs over any preceding multiple word underscore codes at Section 3a. Section 3b includes a logic test relating to the position and context of the hyphen to determine if it is to be converted to a syllable hyphen (coded as $70_{16}$). If the preceding character is a graphic code other than the hyphen code and the hyphen was keyed and the carrier return was keyed (as determined from the state of previously set flag variable (HYPHEN KEYED FLAG and KEYED FLAG) and the hyphen printed beyond the start of the return zone (PPOS>Rt Margin−5), then the hyphen code is converted. Section 4 resets the left margin for an indent clear operation. Section 5 commands the carrier return operation and sets the indicators $E_1$ and $E_3$ to revised end of last word on line and end of last line positions, respectively.

LOGIC TABLE 2

| Process a Carrier Return/Indent Clear | |
|---|---|
| Sec 1 | IF $C_1$ = carrier return code (0C or 0D) |
| • | THEN IF the INSERTED CARRIER RETURN FLAG = 0 |
| • | THEN set m = p |
| Sec 2 | WHILE $M_m$ = word underscore code or multiple word underscore code |
| • | DO |
| • | set m = m − 1 |
| • | ENDWHILE |
| Sec 3 | IF $M_m$ = hyphen code |
| • | THEN set n = m − 1 |
| Sec 3a | WHILE $M_n$ = multiple word underscore code |
| • | DO |
| • | set n = n − 1 |
| • | ENDWHILE |
| Sec 3b | IF $M_n$ = word underscore code or graphic code other than the hyphen code AND |
| • | the KEYED HYPHEN FLAG = 1 AND |
| • | a character has printed beyond RT margin − 5 AND |
| • | the KEYED flag = 1 |
| • | THEN set $M_m$ = syllable hyphen code |
| • | ENDIF |
| • | ENDIF |
| • | Set $M_p$ = carrier return code |
| Sec 4 | ELSE set $M_p$ = $C_1$ (F6) |
| • | set p = p+1 |
| • | set $M_p$ = ACTIVE LEFT MARGIN |
| • | set p = p+1 |
| • | set $M_p$ = $C_1$ |
| • | set ACTIVE LEFT MARGIN = PERMANENT LEFT MARGIN |
| • | ENDIF |
| Sec 5 | set $E_3$ = $E_1$ |
| • | set DELTA = PPOS − ACTIVE LEFT MARGIN |
| • | send DELTA positioning data to decoder 52 (FIG. 3) |
| • | Set $E_1$ = 0 |
| • | RETURN |

Figure 3:
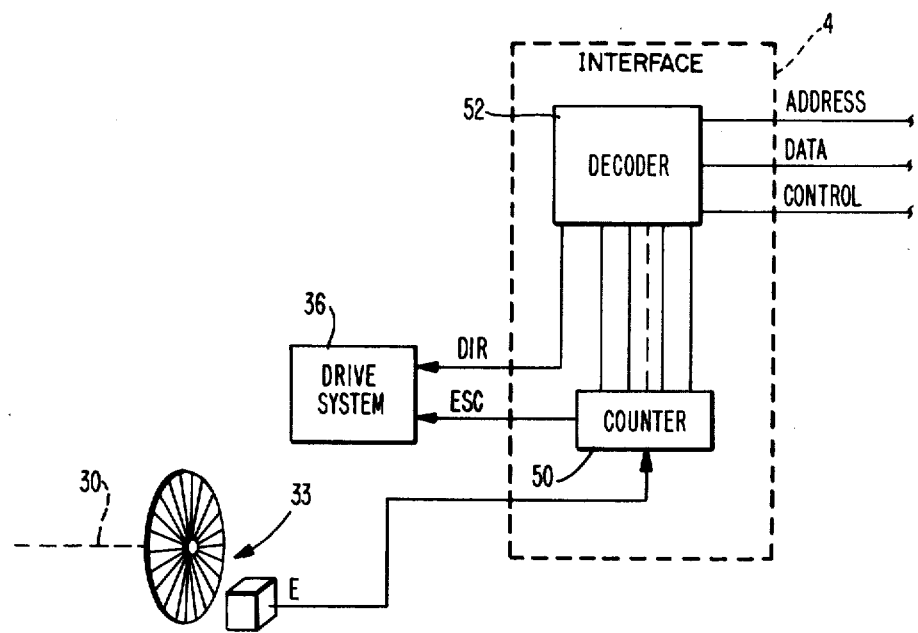
FIG. 3 is a diagram mainly in block form for indicating apparatus for controlling the shifting of a print point for printing apparatus.

Referring to Logic Table 3, the process a destination tab code logic 103 referenced in Section 5 of Logic Table 1 begins at Section 1 by relating the absolute destination to the left margin. Section 2 sets up the travel distance for the tab in the variable TAB SPACE COUNT and Section 3 signals an error if such distance is negative. In Section 3a, a shift distance count and a direction are sent to the decoder 52 of interface 4. If the count for the tabs is in character positions, such count must be scaled to correspond to pulses E of detector 33 (FIG. 3).

In Section 4, index p is incremented to produce a multisection tab code in storage that indicates tab destination and travel distance. For an indent tab code ($F2_{16}$ or $F3_{16}$) the value for the current left margin is also stored in the multi-section code at Section 4a. The margin is changed to the new margin value at Section 4b. The trailing identifier code is added at Section 5.

LOGIC TABLE 3

| Process a Destination Tab Code | |
|---|---|
| Sec 1 | IF $C_1$ is a positive tab code (F0 or F2) |
| • | THEN compute ABSOLUTE DESTINATION = |
| | LEFT MARGIN + TAB DESTINATION |
| Sec 1a | ELSE compute ABSOLUTE DESTINATION = |
| | LEFT MARGIN − TAB DESTINATION |
| • | ENDIF |
| Sec 2 | set TAB SPACE COUNT = |
| | ABSOLUTE DESTINATION − PPOS |
| Sec 3 | IF TAB SPACE COUNT $\leq$ 0 |
| • | THEN set TAB SPACE COUNT = 0 |
| • | signal interface 4 to cause a thump (no motion) |
| Sec 3a | ELSE send the tab space count to the decoder 52 |
| • | Interface 4 and set PPOS = |
| | ABSOLUTE DESTINATION |
| • | ENDIF |
| Sec 4 | set p = p + 1 |
| • | set $M_p$ = $C_1$ (which has a value F0, F1, F2 or F3) |
| • | set p = p + 1 |
| • | set $M_p$ = TAB SPACE COUNT |
| • | set p = p + 1 |
| • | set $M_p$ = TAB DESTINATION |
| • | set p = p + 1 |
| Sec 4a | IF $C_1$ = F2 or F3 |
| • | THEN set $M_p$ = ACTIVE LEFT MARGIN |
| • | set p = p + 1 |
| • | ENDIF |
| Sec 4b | IF $C_1$ = F2 or F3 |
| • | THEN set ACTIVE LEFT MARGIN = PPOS |
| • | ENDIF |
| Sec 5 | Set $M_p$ = $C_1$ |
| • | RETURN |

Logic Table 4 describes logic 104 for adding a character to the address for a content-addressed search (TO) operation. At Section 1, an erase code triggers a decrementing of the search address index (i) to remove a character from the stored address ($T_i$), and indicates when the operation is completed. Such indication may be an operator perceivable vibration or "thump" produced by oscillating the carrier 34 using the drive system 36. A case shift request is processed at Section 2 and Section 3 defines the maximum length for the address text string. Section 4 coordinates the processing of codes representing a graphic.

In particular, Section 4a equates the coded hyphen and the regular hyphen to the regular hyphen code for search comparison purposes. Then section 4b increments the index i and stores the code using the identifier $T_i$. Section 4c equates all of the codes causing a print position shift to a single space code for purposes of comparison for a content-addressed search. Section 5 causes a code that does not represent a valid search address entry to be ignored.

LOGIC TABLE 4

| Add a Character to the To Buffer | |
|---|---|
| Sec 1 | IF $C_1$ = erase code |
| • | THEN IF i $\neq$ 0 |
| • | THEN set i = i − 1 |
| • | thump |
| • | ENDIF |

LOGIC TABLE 4-continued

| Add a Character to the To Buffer | |
|---|---|
| Sec 2 | ELSE IF $C_1$ = SHIFT |
| • | THEN send a command to the interface 4 to |
| | shift the printer case (upper or lower) |
| Sec 3 | ELSE IF i = MAX (the maximum length text |
| | address permitted) |
| • | THEN ignore $C_1$ (no entry in storage occurs) |
| Sec 4 | ELSE IF $C_1$ = a graphic code |
| Sec 4a | THEN IF $C_1$ = coded hyphen code |
| • | THEN set $C_1$ = regular hyphen code |
| • | ENDIF |
| Sec 4b | set i = i + 1 |
| • | set $T_i$ = $C_1$ |
| • | thump |
| Sec 4c | ELSE IF $C_1$ = space code, |
| | coded space code, |
| | tab code, |
| | coded tab code, |
| • | THEN set i = i + 1 |
| • | set $T_i$ = space code |
| • | thump |
| Sec 5 | ELSE ignore $C_1$ (no entry in |
| | storage occurs) |
| • | ENDIF |
| • | ENDIF |
| • | ENDIF |
| • | ENDIF |
| • | ENDIF |
| • | RETURN |

Logic 105 for performing a content-addressed search is described in Logic Table 5. At Section 1, an index t is initialized with the length of the search address and condition indicating variables (flags) are initialized.

Section 2 starts a loop for comparing line beginnings with the stored address. At Section 2a, it is determined if the search is to be toward the leading end of the text string (RETURN mode) and if so, the index i and the indexing direction control variable (j) are initialized accordingly. The index i and direction control variable are initialized for a search toward the trailing end of a text string at Section 2b. In Section 2c, a temporary variable (S) receives a stored code $M_i$ and a temporary index (k) receives the value of index i.

Stepping to the next line is performed at Section 2d. If no more lines are available for testing, an error flag is set at Section 2e, and a command for an indication of error is sent to interface 4. At Section 2f, a transfer to code comparison logic 106 (described below) is initiated.

In Section 3, operator selected operations (PLAY, ADVANCE, RETURN or DELETE) are completed relative to the addressed point in the text string if a matching text segment has been found.

LOGIC TABLE 5

| Do "TO" Mode Search | |
|---|---|
| Sec 1 | set t = i (number of characters keyed in "To" mode) |
| • | set ERROR FLAG = 0 |
| • | set "TO" FLAG = 0 |
| • | set MATCH FAIL FLAG = 1 |
| Sec 2 | WHILE ERROR FLAG = 0 AND |
| | MATCH FAIL FLAG = 1 |
| • | DO |
| Sec 2a | IF $C_1$ = return code |
| • | THEN set i = p − 1 |
| • | set j = −1 |
| Sec 2b | ELSE set i = r |
| • | set j = +1 |
| • | ENDIF |
| Sec 2c | set S = $M_i$ |
| • | set k = i |
| Sec 2d | WHILE S $\neq$ separator AND |
| • | S $\neq$ carrier return code, required |

LOGIC TABLE 5-continued

Do "TO" Mode Search

```
             carrier return code, indent clear
             code, or index code
           DO
           IF S = (one of multiple byte codes)
           THEN set i = i + j * (length of code − 1)
           ENDIF
           set S = M_i
           set i = i + j
           ENDWHILE
Sec 2e    IF i = k
           THEN set ERROR FLAG = 1 and CALL (alarm)
Sec 2f    ELSE i = i + 1
           set q = i
           CALL (See If There is a Match)
           ENDIF
           ENDWHILE
Sec 3     IF MATCH FAIL FLAG = 0
           THEN IF C_1 = Play code
           THEN CALL (Do a Play Operation)
           ELSE IF C_1 = Advance or Return Code
           THEN CALL (Do an Advance/Return Operation)
           C_1 = Delete Code
           THEN CALL (Do a Delete Operation)
           ENDIF
           ENDIF
           ENDIF
           RETURN
```

Referring to Logic Table 6, logic 106 for testing codes for a match to the stored address $T_i$ initializes, at Section 1, flags for indicating the success state of the matching operation. Section 2 starts a loop that successively tests code in a line for a match to the address codes stored in variable $T_k$. Section 2a recognizes space codes in the address string and, in effect, equates them to a single space code for comparison purposes. A temporary variable S receives a code from the stored text string $M_i$ at Section 2b and at Section 2c a syllable hyphen code or coded hyphen code is converted (in effect equated) for comparison purposes to a regular hyphen code. Codes occurring in the text string that correspond to a shift in print point without printing are equated, in effect, to a single space code for comparison purposes at Section 2d.

At Section 2e, codes that represent line or text ending positions are detected and set a flag variable indicating a match failure. Codes that do not represent graphic or print point positioning codes are skipped over at Section 2f. If the address and stored codes are not the same, Section 2g determines whether the codes being tested correspond to a character that is represented by two different codes, e.g. the period and the comma which print the same for upper and lower case. Such codes are equated for comparison purposes and in the preferred embodiment advantage is taken of the fact that one particular core bit has been reserved to distinguish upper case from lower case. If, after equating such characters that are represented by more than one code, the compare still fails, a flag variable (MATCH FAIL FLAG) indicating that fact is set. At Section 2h, a check is made to assure that at least one graphic was a part of the comparison.

LOGIC TABLE 6

See If There is a Match

```
Sec 1     set GRAPHIC FOUND FLAG = 0
           set MATCH FAIL FLAG = 0
           set k = 1
Sec 2     WHILE k ≦ t AND MATCH FAIL FLAG = 0
           DO
           set U = T_k
```

LOGIC TABLE 6-continued

See If There is a Match

```
Sec 2a    IF U = space
           THEN CALL (Position Keyed Characters Beyond
             Space)
           ELSE set the GRAPHIC FOUND flag = 1
           ENDIF
           REPEAT
Sec 2b    set k = k + 1
           set S = M_i
Sec 2c    IF S = syllable hyphen code or coded hyphen
             code
           THEN set S = regular hyphen code
Sec 2d    ELSE IF S = space code, coded space code,
             tab code, or indent code
           THEN CALL (Position Memory Beyond Space)
           set S = space code
           ENDIF
           ENDIF
           set i = i + 1
Sec 2e    IF S = separator code, carrier return code,
             required carrier return code, indent clear
             code, or index code
           THEN set MATCH FAIL FLAG = 1
Sec 2f    ELSE IF S = space code or graphic code
           THEN IF S ≠ U
Sec 2g    THEN IF S is an upper case period
             code or lower case period
             code or upper case comma
             code or lower case
             comma code
           THEN IF S ≠ U without using
             shift bit in compare
           THEN set MATCH FAIL FLAG = 1
           ENDIF
           ELSE set MATCH FAIL FLAG = 1
           ENDIF
           ENDIF
           ENDIF
           ENDIF
           UNTIL S = graphic code or space code OR
             MATCH FAIL FLAG = 1
           ENDREPEAT
           ENDWHILE
Sec 2h    IF GRAPHIC FOUND FLAG = 0
           THEN set MATCH FAIL FLAG = 1
           ENDIF
           RETURN
```

Logic 107 for skipping over multiple space codes in a text address is invoked by the text matching logic 106 of Logic Table 6. Such logic 107 is described in Logic Table 7 and basically involves an advancing of the address index. Logic 108 for examining the text string and equating print position shifting codes and also any adjacent shifting codes to a single space code is described in Logic Table 8. Again, an index incrementing operation advances the compare past these codes and the temporary variable S in Logic Table 6 is set to be the space code.

LOGIC TABLE 7

Position Keyed Characters Beyond Space

```
WHILE T_{k+1} = space code AND k ≠ t
DO
set k = k + 1
ENDWHILE
RETURN
```

LOGIC TABLE 8

Position Memory Beyond Space

```
WHILE M_{i+1} = space code, coded space code, tab
  code (F0 or F1) or indent code (F2 or F3)
DO
set i = i + 1
ENDWHILE
```

LOGIC TABLE 8-continued

| Position Memory Beyond Space |
|---|
| RETURN |

Referring to Logic Table 9, the logic 109 for printing from storage is described. Section 1 indicates generally a test for termination which, for the preferred implementation, may be a word ending code or a line ending code or a line found by a search (TO MODE) or at the operator's choice by selecting a key in conjunction with the PLAY key. Also, a second depression of the PLAY key is preferably treated as a command to stop. A loop is initiated and a flag (the KEYED FLAG) is set to indicate codes are originating from storage and not the keyboard. A test is made at the start of Section 2 to determine whether the operator has selected the ADJUST mode (which action sets the ADJUST FLAG to 1) indicating that line ending will be automatically adjusted rather than printed as originally keyboarded. Syllable hyphens and discretionary carrier returns are deleted from the text string if they occur at a printer position (PPOS) to the left of the beginning of the return zone (here assumed as the right margin—5 character position increments) and a carrier return will not be inserted after a syllable hyphen that precedes the beginning of the return zone. At Section 2b, a space code which is followed by a graphic code triggers a transfer to logic 110 for scanning a word for inserting a carrier return (described below). The purpose of the logical testing of Section 2b is to locate a word beginning point and additional testing may be required if control codes, for example, can occur between a space and a graphic in circumstances where treatment as a word beginning is desired.

If the location for inserting a carrier return (stored in the variable INSERT CR LOCATION) is the present printing position (PPOS) then a carrier return is inserted at Section 3 using the PROCESS A CARRIER RETURN logic 102 described above with reference to Logic Table 2. At Section 4, the next code of the string is accessed.

Multisection tab codes are processed in Section 5 and eliminate any need to reference the present tab settings. The tab destination is determined by moving two additional storage locations ($M_{R+2}$) toward the trailing end to access the stored value for tab destination. The index i is then loaded with the number of storage locations that must be skipped for either a special multisection tab code or a special indent tab code. In Section 6, the pointer indexes for the reference locations in storage are incremented by the index i. Then with all of the above preparatory operations completed, a transfer is initiated in Section 7 to the process a character logic 101 described with reference to Logic Table 1.

LOGIC TABLE 9

| | Do a Play Operation |
|---|---|
| Sec 1 | While a termination code is not detected |
| Sec 1a | DO |
| | (Note: the next character to be played is $M_r$) |
| | set KEYED FLAG = 0 |
| Sec 2 | IF ADJUST FLAG = 1 |
| Sec 2a | THEN IF ($M_r$ is a syllable hyphen code or discretionary carrier return code) AND (PPOS < RT margin − 5 AND ($M_r$ = SYLLABLE HYPHEN CODE AND INSERT CR LOCATION ≠ PPOS)) |
| | THEN delete the syllable hyphen or discretionary CR |

LOGIC TABLE 9-continued

| | Do a Play Operation |
|---|---|
| Sec 2b | ELSE IF $M_r$ = graphic code and $M_p$ = space code |
| | THEN CALL (Scan the Word for Inserting a Carrier Return) |
| | ENDIF |
| | ENDIF |
| | ENDIF |
| Sec 3 | IF INSERT CR LOCATION = PPOS |
| | THEN set the INSERTED CARRIER RETURN FLAG = 1 |
| | set $C_1$ = CR code |
| | CALL (Process a Carrier Return/Indent Clear) |
| | ENDIF |
| Sec 4 | set i = 1 |
| | set $C_1 = M_r$ |
| Sec 5 | IF $C_1$ = tab or indent tab (If C = $F0_{16}$ or $F1_{16}$ or $F2_{16}$ or $F3_{16}$) |
| | THEN set TAB DESTINATION = $M_{r+2}$ |
| | set i = 4 |
| | IF $C_1$ = indent tab (F2 or F3) |
| | THEN set i = 5 |
| | ENDIF |
| | ENDIF |
| Sec 6 | set p = p + i |
| | set r = r + i |
| Sec 7 | CALL (Process a Character) |
| | ENDWHILE |
| | RETURN |

Referring to Logic Table 10, logic 110 for adjusting text by checking the effect of individual words on line appearance is described. In Section 1, various flag variables are set that bear information indicated by their names. The end of the preceding word is stored in variable E2 in Section 2 including the effect of an inserted carrier return. A set of hyphen location indicators are initialized in Section 3 as is indexing variable i. The word end portion for the next word is calculated in the loop starting at Section 4 with control codes being treated specially in the loop starting at Section 4a. Section 5 serves to include word ending dashes in the word. At Section 6, operation is terminated for a hyphenate mode if selected by the operator and operator intervention is required to continue PLAY operation.

LOGIC TABLE 10

| | Scan the Word for Inserting a Carrier Return |
|---|---|
| Sec 1 | set the HYPHEN LEFT OF ZONE FLAG = 0 |
| | DISCRETIONARY CR SCANNED FLAG = 0 |
| | NON-HYPHEN GRAPHIC IN WORD FLAG = 0 |
| | LAST CHARACTER WAS HYPHEN FLAG = 0 |
| | SYLLABLE HYPHEN LEFT OF ZONE FLAG = 0 |
| | HYPHENATED WORD FLAG = 0 |
| | HYPHENATION LOCATION FLAG = 0 |
| Sec 2 | IF INSERTED CR LOCATION ≠ PPOS |
| | THEN set E2 = PPOS |
| | ELSE set E2 = LEFT MARGIN |
| | ENDIF |
| Sec 3 | set PREZONE HYPHEN and POSTZONE HYPHEN = −1 |
| | set i = r |
| Sec 4 | REPEAT |
| | CALL (Compute the Character's Escapement) |
| Sec 4a | REPEAT |
| | set i = i + 1 |
| | UNTIL $M_i$ ≠ Stop Code or continuous underscore code or index code or a discretionary carrier return played before zone or a carrier return followed by a carrier return |
| | ENDREPEAT |
| | UNTIL (the HYPHENATION LOCATION FLAG = 1 AND $M_{i+1}$ ≠ hyphen) OR |
| | $M_i$ is not a graphic code, or a backspace code |

LOGIC TABLE 10-continued
Scan the Word for Inserting a Carrier Return

|  |  |
|---|---|
| • | followed by a graphic ($M_{i+1}$ = graphic code) |
| • | ENDREPEAT |
| Sec 5 | IF $M_i$ = space |
| • | THEN add to E2 the escapement for any word ending dashes |
| • | ENDIF |
| Sec 6 | IF E2 is beyond the right margin AND the NONHYPHEN GRAPHIC IN WORD FLAG = 1 |
| • | THEN IF HYPHENATE MODE IS SELECTED |
| • | THEN stop for hyphenation |
| • | ELSE CALL (See Where to Insert a Carrier Return) |
| • | ENDIF |
| • | ENDIF |
| • | RETURN |

Referring to Logic Table 11, logic 111 is described for computing a character escapement. At Section 1, flag variables are set for indicating that a hyphen or certain control codes have not been encountered as the only characters in the word. In Section 2, flag variables (having names descriptive of purpose) are set to indicate the occurrence of a hyphen code in a word and the location of the hyphen relative to the right margin. In Section 3, the escapement for the accessed code is added to the total E2 which, when accumulation is complete, indicates the end of the next word. The escapement value is accessed from ROS 14 (FIG. 1) in a table referenced to the text codes. If the code represents a syllable hyphen, no addition to the total occurs unless, based on the location for inserting a carrier return, the hyphen would be printed. In Section 4, the reverse escapement effect of a backspace operation is included in the WORD END total.

LOGIC TABLE 11
Compute the Character's Escapement

|  |  |
|---|---|
| Sec 1 | IF $M_i \ne$ hyphen, continuous underscore, word underscore, index, or coded space codes |
| • | THEN set the NONHYPHEN GRAPHIC IN WORD FLAG = 1 |
| • | IF the HYPHEN LEFT OF ZONE FLAG = 1 |
| • | THEN set PREZONE HYPHEN = E2 |
| • | ENDIF |
| • | ENDIF |
| • | set HYPHEN LEFT OF ZONE FLAG = 0 and LAST CHARACTER WAS HYPHEN FLAG = 0 |
| Sec 2 | IF $M_i$ is a graphic code |
| Sec 2a | THEN IF $M_i$ is a hyphen code or syllable hyphen code and $M_{i-1} \ne$ space code |
| Sec 2b | THEN set the LAST CHARACTER WAS HYPHEN FLAG = 1 |
| Sec 2c | IF E2 < RT MARGIN − 5 |
| • | THEN set the HYPHEN LEFT OF ZONE FLAG = 1 |
| Sec 2d | ELSE IF RT MARGIN − 5 $\le$ E2 < RT MARGIN |
| • | THEN set the HYPHENATION LOCATION FLAG = 1 |
| Sec 2e | ELSE IF POSTZONE HYPHEN = −1 or POSTZONE HYPHEN = E2 − 1 |
| Sec 2f | THEN set POSTZONE HYPHEN = E2 |
| • | ENDIF |
| • | ENDIF |
| • | ENDIF |
| • | ENDIF |
| Sec 3 | IF $M_i \ne$ syllable hyphen code OR the HYPHEN LEFT OF ZONE FLAG = 0 |
| • | THEN set E2 = E2 + the escapement for this character (stored in a table in ROS 14) |
| • | ENDIF |
| Sec 4 | ELSE IF $M_i$ = backspace code |
| • | THEN set E2 = E2 − 1 |
| • | ENDIF |
| • | ENDIF |

LOGIC TABLE 11-continued
Compute the Character's Escapement

|  |  |
|---|---|
| • | RETURN |

Referring to Logic Table 12, a set of zone boundaries (Z12, Z23, Z34, Z45 and Z56) for line adjustment are first established in Section 1, and are related to the right margin. One of the boundaries (Z56) (represented as the variable PAPER EDGE) corresponds to the usual location of the paper edge. A variable E3 has been established (Logic Table 2) with the stored value of the printer position for the ending of the last line. And variable E1 contains (Logic Table 1) the end position for the last word printed. E2 is the variable that contains the location code for the end of the next word to be printed. In Section 2, a variable POST ZONE HYPHEN is set to indicate the end of the next word if a hyphen can be used as a word break point. Also, if there will be a hyphen in the return zone or this is the first word of a line which is caused to be printed irrespective of end point no testing relative to zone boundaries is necessary to decide to print the next word and a transfer to Section 5 occurs. The variables E1, E2 and E3 are compared to the zone boundaries (Z12, Z23, Z34, Z45 and Z56) in Section 3 which defines tests for deciding whether or not to insert a carrier return.

In Section 4, a carrier return is inserted based on the above-discussed tests at the end of the last word printed, a check being made to account for a hyphen in the next word that would print before the return zone. If the tests determine that a carrier return is not to be inserted before the next word, then the variable INSERT CR LOCATION is loaded with the end of the next word in Section 5.

LOGIC TABLE 12
See Where to Insert a Carrier Return

|  |  |
|---|---|
| Sec 1 | set Z23 = RT margin − 5 |
| • | set Z34 = RT MARGIN |
| • | set Z12 = Z23 −5 |
| • | set Z45 = Z34 + 5 |
| • | set Z56 = Z45 +6 |
| • | (Note E3 = position on previous line where the last graphic was printed) |
| • | (Note E1 = position on current line where the last graphic was printed) |
| • | reset the LEFT SIDE and RIGHT SIDE FLAG to 0 |
| Sec 2 | IF POSTZONE HYPHEN $\ne$ −1 |
| • | THEN set E2 = POSTZONE HYPHEN |
| • | ENDIF |
| • | IF the HYPHENATION LOCATION FLAG = 0 (a hyphen is not in the return zone) AND E1 $\ne$ 0 (this is not the first word to be printed on this line) |
| Sec 3 | THEN IF E2 > Z45 |
| • | THEN IF E2 > Z56 |
| • | THEN set the LEFT SIDE FLAG = 1 |
| • | ELSE IF E1 < Z12 |
| • | THEN set the RIGHT SIDE FLAG |
| • | ELSE set the LEFT SIDE FLAG |
| • | ENDIF |
| • | ENDIF |
| • | ELSE IF E3 < Z12 OR E3 > Z45 OR (Z23 < E3 $\le$ Z34) |
| • | THEN IF E1 > Z12 |
| • | THEN IF Z23 − E1 < E2 − Z34 |
| • | THEN set the LEFT SIDE FLAG |
| • | ELSE set the RIGHT SIDE FLAG |
| • | ENDIF |
| • | ELSE set the RIGHT SIDE FLAG |
| • | ENDIF |
| • | ELSE IF E3 < Z23 AND E1 < Z23 |
| • | THEN set the LEFT SIDE FLAG |
| • | ELSE set the RIGHT SIDE FLAG |

LOGIC TABLE 12-continued

| | See Where to Insert a Carrier Return |
|---|---|
| • | ENDIF |
| • | ENDIF |
| • | ENDIF |
| Sec 4 | IF the LEFT SIDE FLAG is set |
| • | THEN IF PREZONE HYPHEN = −1 |
| • | THEN set INSERT CR LOCATION = E1 |
| • | ELSE set INSERT CR LOCATION = PREZONE |
| • | HYPHEN |
| • | ENDIF |
| Sec 5 | ELSE set INSERT CR LOCATION = E2 |
| • | ENDIF |
| • | ENDIF |
| • | RETURN |

Referring to Logic Table 13, logic 113 for erasing a code from text storage is described. At Section 1, separator codes are detected and, for such codes, no erase action is taken. Multisection codes are detected at Section 2, to permit special processing of such codes. If a multisection code is not an indent tab or indent clear, it is a tab code (F0 or F1) and can be erased. At Section 2b, the tab shift distance and tab destination sections of a destination tab code are decremented by one unit for each erase operation. When the shift distance is decremented to zero, as determined at Section 2c, the leading reference address in storage is shifted so that the multisection tab code is in the empty storage gap (effectively erased). A shift command is sent to the printer at Section 2d. For codes other than the special multisection codes, the normal erase operation is initiated. Since such operation is known and does not bear a close relationship to the invention, a detailed description will not be provided.

LOGIC TABLE 13

| | Erase |
|---|---|
| Sec 1 | IF $M_p \neq$ separator code |
| Sec 2 | THEN IF $M_p$ = multisection code (Fx) |
| Sec 2a | THEN IF $M_p \neq$ indent tab (F2, F3) or indent clear (F6) |
| • | THEN |
| Sec 2b | set $M_{p-2} = M_{p-2} - 1$ (space counts) |
| • | set $M_{p-1} = M_{p-1} - 1$ |
| Sec 2c | IF $M_{p-2} = 0$ |
| • | THEN set p = p−4 |
| • | ENDIF |
| Sec 2d | Move the printer 1 space backward by sending distance and direction data to decoder 52 of interface 4 (FIG. 3) |
| • | ENDIF |
| Sec 3 | ELSE erase the character (e.g. set p = p−1 and send erase signals to interface 4 |
| • | ENDIF |
| • | ENDIF |

The logic 114 triggers text store operations using a STORE FLAG which is toggled between the zero and one states in response to the code indicating the STORE key has been depressed (see Logic Table 14). Additional sophistication may be provided to permit storage of individually retrievable documents as is known in the art.

LOGIC TABLE 14

| Store |
|---|
| IF $C_1$ = Store Code |
| THEN invert STORE FLAG |
| ENDIF |
| RETURN |

The logic 115 is used for the delete mode of operation. According to a presently preferred implementation, the codes to be deleted from a text string are caused by a shift in reference point location r to come within the gap of "empty storage" so as to be effectively deleted from the text string (see Logic Table 15). If a word or line mode has been selected, the destination memory position must be determined by searching for a word or line ending, respectively, as is known in the art.

LOGIC TABLE 15

| Delete |
|---|
| IF "TO" FLAG = 1 |
| THEN q is the final memory position for the delete |
| ELSE find q (e.g. line, word) based on type of location |
| ENDIF |
| set r = q |
| RETURN |

The logic 116 for advance and return operations is described in Logic Table 16. At Section 1, it is determined if the reference point destination has already been identified by a content-addressed ("TO" mode) search. If not, the destination is determined according to the selected mode (e.g. line, word) by scanning for a corresponding ending code as is known in the art.

In Section 2, a direction indicator i is established to indicate the direction of reference point movement is toward the leading end (return) or trailing end (advance) of text storage. The shifting of the reference point is effected in a separate block of logic (Logic Table 17) that is entered by a transfer operation at Section 3.

At Section 4, a temporary index j is set to the location p of the leading end (of the empty space gap) reference position and a temporary variable (ESCAPEMENT) for storing print position shifts is initialized to zero. Print position shifts are accumulated in Section 5 for codes toward the leading end of storage until the beginning of the line is located by encountering a code such as a carrier return code. If a destination tab code ($F0_{16}$ or $F1_{16}$) is encountered, the shift distance is extracted from the portion of the multisection code containing such information (the second byte of four) and the index j is reduced to move to the next code. For other codes, the print position shift is determined from a stored table (data stored in ROS 14, FIG. 1) and added to the total. At Section 6, the total in the variable ESCAPEMENT is referenced to the active left margin and the shift from the present printing position PPOS is sent to the interface 4 to cause a print position shift.

LOGIC TABLE 16

| | Advance/Return |
|---|---|
| Sec 1 | IF "TO" FLAG = 1 |
| • | THEN q is the final memory position for the operation |
| • | ELSE find q based on type of operation (e.g. line, word) |
| • | ENDIF |
| Sec 2 | IF C = Advance Code |
| • | THEN set i = +1 |
| • | ELSE set i = −1 |
| • | ENDIF |
| Sec 3 | CALL (Shift Reference to New Position) |
| Sec 4 | set j = p |
| • | set ESCAPEMENT = 0 |
| Sec 5 | WHILE $M_j \neq$ separator code, carrier return code, required carrier return code, indent clear code, or indent tab code |
| • | DO |

LOGIC TABLE 16-continued

| Advance/Return | |
| --- | --- |
| Sec 5a | IF $M_j$ = destination tab code (F0, F1) |
| • | THEN set ESCAPEMENT = ESCAPEMENT + $M_{j-2}$ |
| | set j = j−3 |
| • | ELSE add stored escapement value corresponding to the character to ESCAPEMENT |
| • | ENDIF |
| • | set j = j−1 |
| • | ENDWHILE |
| Sec 6 | set DELTA = ACTIVE LEFT MARGIN + ESCAPEMENT − PPOS |
| ° | send DELTA positioning data to decoder 52 (FIG. 3) |
| • | RETURN |

The logic 117 for shifting to a new position in text storage that is entered from the advance/return logic 116 of Logic Table 16 is described in Logic Table 17. A test is performed at Section 1 to determine when the destination location (q) has been reached for either advance or return operation. At Section 2, a temporary index k is initialized to r or p, respective of whether an advance or return operation is being performed.

In Section 3, a temporary variable S receives $M_k$. The active left margin is changed in Section 4a in recognition of an advance past an indent tab code. For a positive indent tab (F2) the destination stored at the third section of the multisection indent tab code is added to the active left margin. For a negative destination tab code (F3), the tab destination is subtracted from the active left margin. When a return operation over an indent tab occurs, the active left margin is restored to the value that it had when the indent tab was originally keyed (represented at the second segment (byte) of the indent tab code from the trailing end).

At Section 5, an indent clear code is detected and for advance operation (Section 5a), the active left margin is shifted to coincide with the permanent left margin. If a return operation over an indent clear code is detected, Section 5b sets the active left margin to coincide with the left margin stored in the section of the indent clear code at location k-1.

At Section 6, indexes p and r are adjusted for a shift beyond the present code including the extra shift for the multisection tab codes and indent tab codes.

LOGIC TABLE 17

| Shift Reference to New Position | |
| --- | --- |
| Sec 1 | WHILE r ≠ q AND p−1 ≠ q |
| ° | DO |
| Sec 2 | IF i = +1 |
| • | THEN set k = r |
| • | Else set k = p |
| ° | ENDIF |
| Sec 3 | set S = $M_k$ |
| Sec 4 | IF S = indent tab code (F2 or F3) |
| Sec 4a | THEN IF i = +1 |
| • | THEN IF S = F2 |
| • | THEN set ACTIVE LEFT MARGIN = $M_{k+2}$ (tab destination) + ACTIVE LEFT MARGIN |
| • | ELSE set ACTIVE LEFT MARGIN = ACTIVE LEFT MARGIN − $M_{k+2}$ |
| • | ENDIF |
| Sec 4b | ELSE set ACTIVE LEFT MARGIN = $M_{k-1}$ (old left margin) |
| • | ENDIF |
| Sec 5 | ELSE IF S = indent clear code (F6) |
| Sec 5a | THEN IF i = +1 |
| • | THEN set ACTIVE LEFT MARGIN = PERMANENT LEFT MARGIN |
| Sec 5b | ELSE set ACTIVE LEFT MARGIN = $M_{k-1}$ (previous left margin) |
| • | ENDIF |

LOGIC TABLE 17-continued

| Shift Reference to New Position | |
| --- | --- |
| • | ENDIF |
| • | ENDIF |
| Sec 6 | set n = number of sections in code |
| • | (F0, F1 set n = 4 |
| • | F2, F3 set n = 5 |
| • | F6 set n = 3 |
| • | all others set n = 1) |
| • | set p = p + n × i |
| • | set r = r + n × i |
| • | ENDWHILE |

Figure 8:
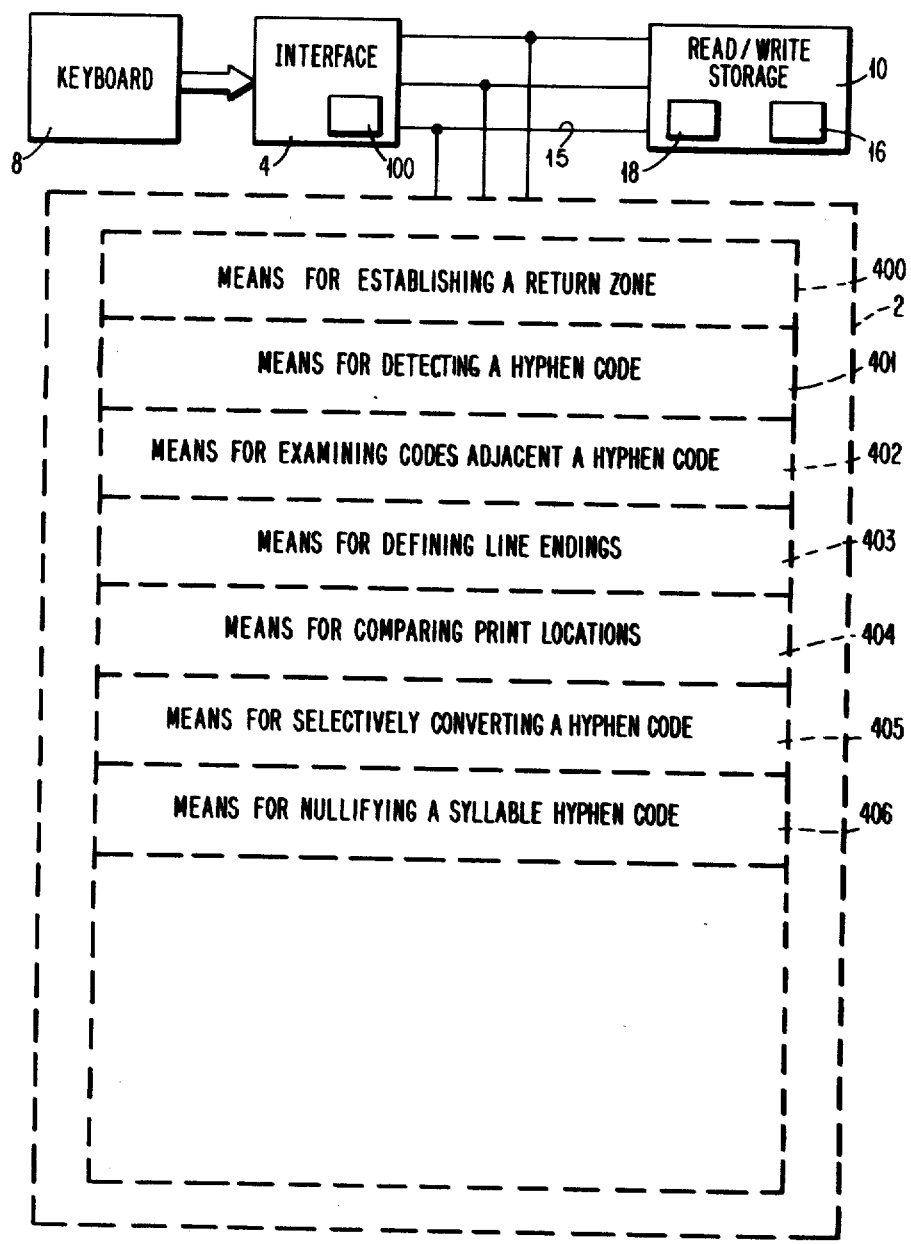
FIG. 8 is a block diagram emphasizing signal processing logic partitioned according to functions significant to the invention.

Referring to FIG. 8, signal processing logic, which is significant to the subject invention and resides in the structure of the logic device 2 will be identified functionally and referenced to appropriate portions of FIG. 5 and Logic Tables 1–17 where more detailed description relating to processing basic structures or constructs is presented. Means for establishing a return zone 400 relates to testing based on the right margin and a point five character positions preceding, as indicated by Logic Table 12, identifiers Z23 and Z34, Logic Table 1, Section 1, and Logic Table 9, Section 2. Means 401 for detecting a hyphen code is indicated in Block 300 as well as the If construct of Logic Table 1, Section 1, and Logic Table 2, Section 3. Means 402 for examining codes adjacent the hyphen code is indicated in the Then If construct of Logic Table 2, Section 1, and the If construct of Section 3b as well as Blocks 304 and 306. Means 403 for defining line endings is indicated at Logic Table 2, Section 3b, the last construct, and in Logic Table 12. Means 404 for comparing print locations is indicated in Block 302 and in the Logic Table 2, 3b If construct. Means 405 for selectively converting a hyphen code is indicated at the THEN SET construct of Section 3b of Logic Table 2 considering that transfer is imposed by the preceding If construct that sets conditions for conversion. Converting means 405 is also indicated in Block 308. Means 406 for nullifying a syllable hyphen code eliminates printing of syllable hyphen codes preceding the return zone and is indicated at Logic Table 9, Section 2a, and includes consideration that transfer conditions are imposed by the preceding THEN IF construct.

The invention and a presently preferred implementation thereof have been described in detail. It will be appreciated, however, that variations and modifications within the scope of the invention will be suggested to those skilled in the art. For example, various types of printers may be employed in implementing the invention including non-impact printers such as ink jet printers. Also, various logic devices may be employed to implement the invention including discrete device type logic.

What is claimed is:

1. In a typewriter of the kind having a keyboard apparatus that sequentially produces coded signals representing printing operations, said signals including a coded normal hyphen signal representative of a hyphen printing operation, plural coded signals representing graphic printing operations and a coded carrier return signal, said typewriter further including a printing apparatus that responds to coded signals to position a print point and to print indicia along a line, means for maintaining a stored record of the present printing position along a line, means for establishing a beginning location for a return zone along said line, and storage means for storing said coded signals originating from said keyboard apparatus, a hyphen characterization system comprising:
- means for detecting said coded normal hyphen signal in a sequence of coded signals produced at said keyboard apparatus;
- means, cooperating with said detecting means, for examining the coded signals adjacent to said coded normal hyphen signal when detected in said sequence of coded signals to determine the nature of the printing operations represented thereby;
- means for comparing the present print location and the beginning location for the return zone;
- means for selectively converting said coded normal hyphen signal, prior to receipt by said storage means, to a distinctive coded signal for a syllable hyphen based in part on the nature of said adjacent coded signals as determined by said examining means and in part based on the results of the comparison by said comparison means;
- means for defining line endings during playback from storage, said defining means recognizing as potential line ending codes, said coded normal hyphen signal and said coded syllable hyphen signal; and
- means, operative on playback from said storage means, for nullifying a coded syllable hyphen signal that does not occur upon playback at a position in said sequence of coded signals that corresponds to the end of a line, whereby syllable hyphens that may be omitted and hyphens that are always printed may be represented at said keyboard apparatus by a common code.

2. A hyphen characterization system according to claim 1 wherein said examining means determines whether the coded signal preceding a detected coded normal hyphen signal represents a graphic and whether the code following a detected coded normal hyphen signal represents a carrier return originating at said keyboard apparatus.

* * * * *